(12) United States Patent
Mikamo et al.

(10) Patent No.: US 8,073,593 B2
(45) Date of Patent: Dec. 6, 2011

(54) VEHICLE STEERING APPARATUS

(75) Inventors: Satoru Mikamo, Okazaki (JP); Hiroaki Kato, Hekinan (JP); Takashi Kodera, Okazaki (JP); Takehiro Ito, Mie-ken (JP)

(73) Assignee: JTEKT Corporation, Osaka-shi (JP)

( * ) Notice: Subject to any disclaimer, the term of this patent is extended or adjusted under 35 U.S.C. 154(b) by 665 days.

(21) Appl. No.: 12/178,117

(22) Filed: Jul. 23, 2008

(65) Prior Publication Data

US 2009/0030573 A1 Jan. 29, 2009

(30) Foreign Application Priority Data

Jul. 24, 2007 (JP) ................................ 2007-192385

(51) Int. Cl.
*A01B 69/00* (2006.01)
*B62D 6/00* (2006.01)

(52) U.S. Cl. .............. 701/41; 701/51; 701/61; 180/170; 180/197; 180/6.2; 180/410

(58) Field of Classification Search .................... 701/41, 701/51, 61, 70, 81; 180/167, 170, 197, 204, 180/6.2, 252, 410

See application file for complete search history.

(56) References Cited

U.S. PATENT DOCUMENTS

| 6,415,215 | B1 * | 7/2002 | Nishizaki et al. ............... 701/70 |
| 2005/0228564 | A1 | 10/2005 | Kato et al. |
| 2005/0273235 | A1 | 12/2005 | Ohta et al. |
| 2006/0080016 | A1 * | 4/2006 | Kasahara et al. ............... 701/41 |

FOREIGN PATENT DOCUMENTS

| EP | 1 584 544 | | 10/2005 |
| EP | 1 602 559 | | 12/2005 |
| EP | 1 731 408 | A1 | 12/2006 |
| JP | 5-139327 | | 6/1993 |
| JP | 2002-254964 | | 9/2002 |
| JP | 2005-262926 | | 9/2005 |

* cited by examiner

*Primary Examiner* — Gertrude Arthur Jeanglaude
(74) *Attorney, Agent, or Firm* — Oblon, Spivak, McClelland, Maier & Neustadt, L.L.P.

(57) ABSTRACT

A control ON/OFF determination unit determines that oversteer control should be started in the case where a slip angle differential value is equal to or greater than a predetermined threshold value, the sign of the slip angle differential value is identical with the sign of a yaw rate, the sign of a steering wheel turning angle is identical with the sign of a steering wheel turning speed, and a vehicle speed is equal to or greater than a predetermined threshold value.

13 Claims, 9 Drawing Sheets

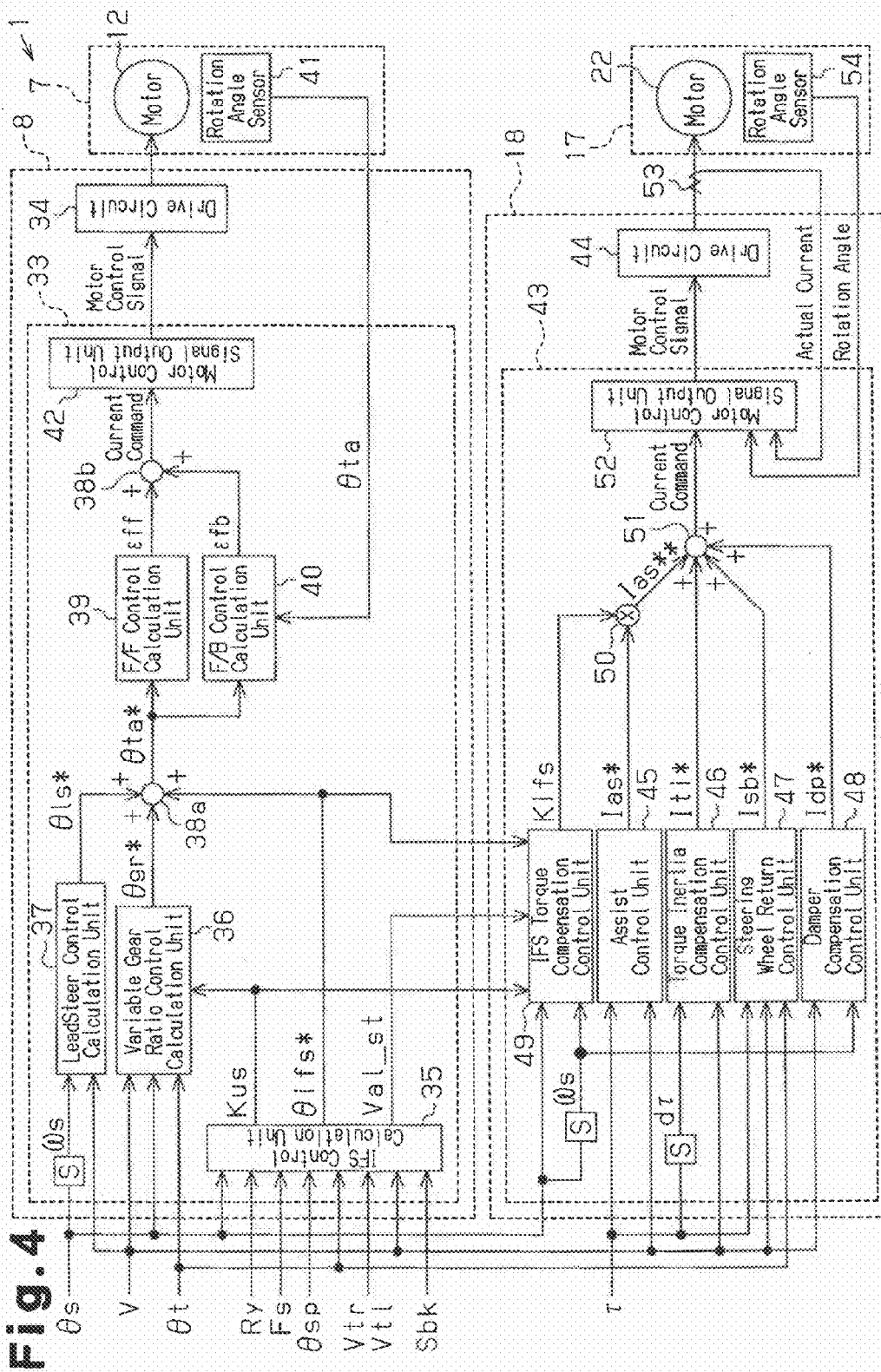

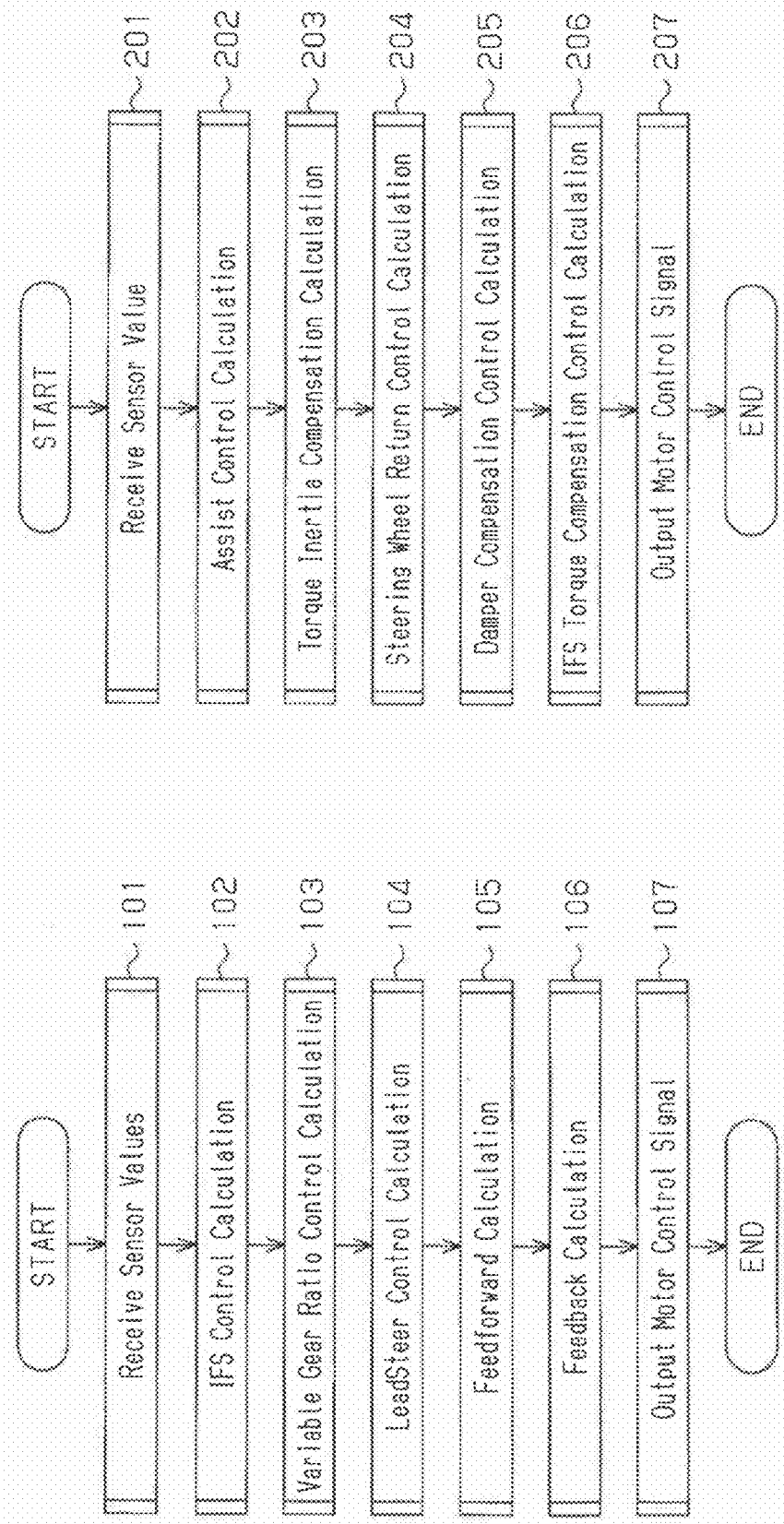

VEHICLE STEERING APPARATUS

This application is based on and claims priority from Japanese Patent Application No. 2007-192385 filed on Jul. 24, 2007, the entire contents of which are incorporated herein by reference.

BACKGROUND OF THE INVENTION

The present invention relates to a vehicle steering apparatus.

In recent years, there has been proposed a steering control system provided with an active steering function determining a steering characteristic of a vehicle based on a detection of a state quantity such as a vehicle speed, a yaw rate or the like, and controlling the angle (tire angle) of wheels so as to control the yaw moment of a vehicle based on a result of determination.

For example, a vehicle steering apparatus described in Japanese Laid-Open Patent Publication No. 2005-262926 is provided with a variable transmission ratio device which changes a gear ratio corresponding to a transmission ratio between a steering wheel and vehicle wheels. The variable transmission ratio device changes the gear ratio mentioned above by superimposing an ACT angle, which is a second steering angle of the wheels based on the activation a motor, on a first steering angle of the wheels based on an operation of the steering wheel. In the case where a steering characteristic is oversteer, the apparatus controls the ACT angle so as to generate a steered angle in an opposite direction to the yaw moment. On the other hand, in the case where the steering characteristic is understeer, the apparatus changes the gear ratio mentioned above in such a manner as to reduce a changing amount of the steered angle with respect to a turning operation of the steering wheel. It is possible to stabilize the attitude of the vehicle by automatically controlling the operating angle of the wheels as mentioned above.

Conventionally, many of the steering apparatuses monitor the yaw rate of the vehicle and determine whether the active steering control needs to be started. However, under a condition where a friction coefficient μ of a road surface is extremely low, such as a frozen road or the like, there is a tendency that the attitude of the vehicle becomes unstable in a moment of time due to even a small change of the steered angle or a change of a load. Accordingly, there may be a case in which the attitude of the vehicle has been already unstable at a time when the yaw rate corresponding to a threshold value for starting the active steering control is detected. In this case, there is a problem that a relatively long time is necessary until the active steering control is subsided, that is, until the attitude of the vehicle is stabilized.

Japanese Laid-Open Patent Publication No. 5-139327 discloses a method of determining that a turning operation of a vehicle reaches a limit and the attitude of the vehicle becomes unstable if a differential value of a slip angle of the vehicle, that is, the absolute value of an angular velocity of a side slip becomes equal to or greater than a threshold value. In accordance with this method, it is possible to instantaneously detect that the attitude of the vehicle is unstable, by monitoring the differential value of the slip angle.

However, there is a problem that a lot of erroneous determinations exist in the method of determining the attitude of the vehicle based on the differential value of the slip angle. In other words, in the case where the active steering control is started based on an erroneous determination, the attitude of the vehicle may be made more unstable. Accordingly, there is generally employed a method of determining when to start the active steering control based on the yaw rate.

SUMMARY OF THE INVENTION

An objective of the present invention is to provide a vehicle steering apparatus which starts an active steering control in an early stage without any erroneous determination so as to quickly stabilize the attitude of a vehicle.

To achieve the foregoing objective and in accordance with one aspect of the present invention, a vehicle steering apparatus including a variable transmission ratio device and control means is provided. The variable transmission ratio device is provided in a steering transmission system between a steering wheel and a vehicle wheel. The variable transmission ratio device varies the ratio of the tire angle of the wheel to the turning angle of the steering wheel, by superimposing a first steering angle of the wheel based on operation of the steering wheel on a second steering angle of the wheel based on actuation of a motor mounted to a vehicle. The control means controls the actuation of the variable transmission ratio device. The control means executes an active steering control in which the control means automatically changes the second steering angle so as to stabilize the attitude of the vehicle. The control means starts the active steering control in the case where a slip angle differential value is equal to or greater than a predetermined threshold value, the sign of the slip angle differential value is identical with the sign of a yaw rate, the sign of the steering wheel turning angle is identical with the sign of a steering wheel turning speed, and the vehicle speed is equal to or greater than a predetermined threshold value.

BRIEF DESCRIPTION OF THE DRAWINGS

FIG. 4 is a block diagram of a vehicle steering apparatus;

FIG. 5 is a flowchart showing a procedure of a calculation process in an IFSECU;

FIG. 6 is a flowchart showing a procedure of a calculation process in an EPSECU;

DETAILED DESCRIPTION OF THE PREFERRED EMBODIMENTS

A description will be given below of an embodiment according to the present invention with reference to the accompanying drawings.

Figure 1:
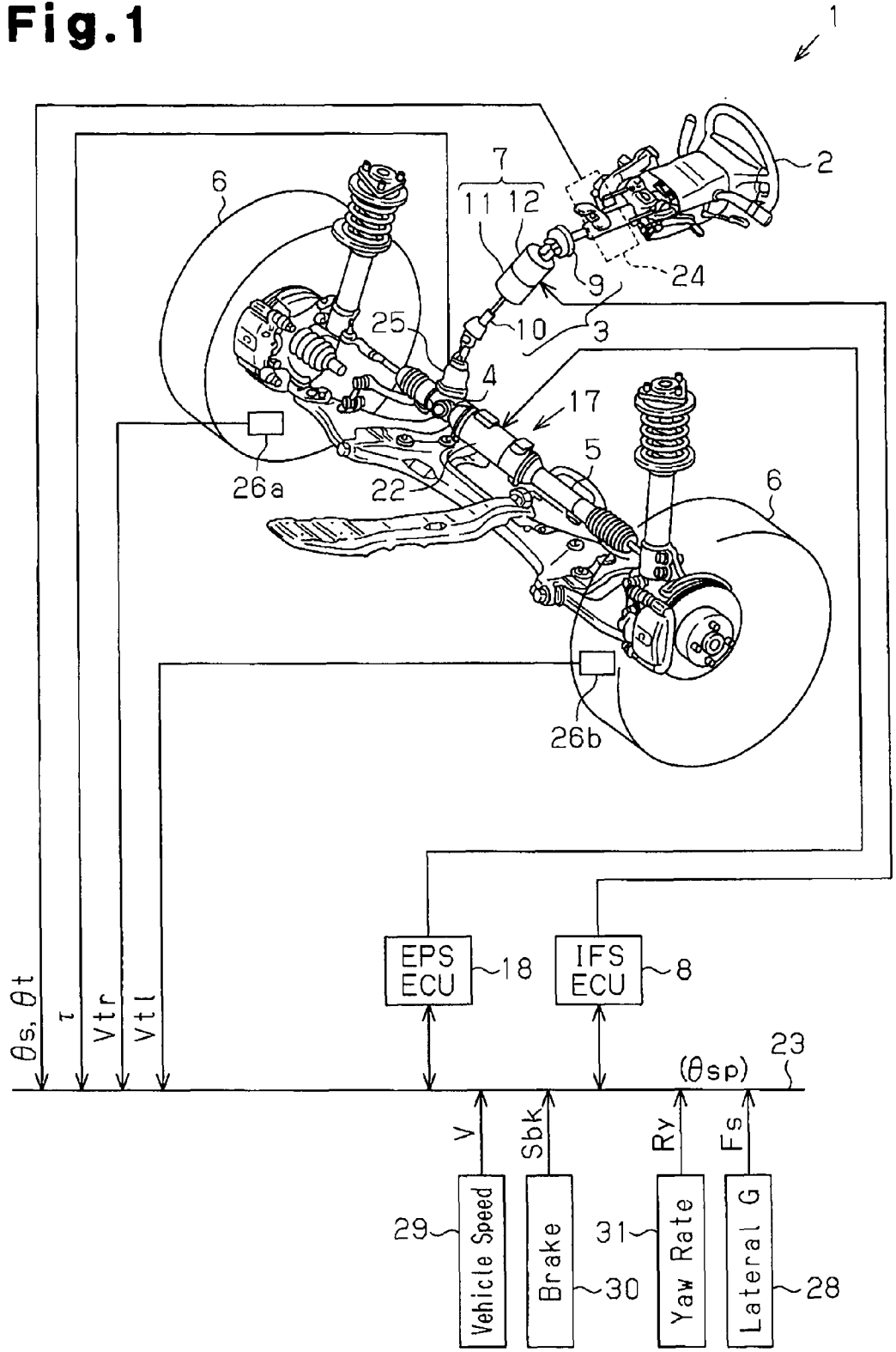
FIG. 1 is a schematic view showing the structure of a vehicle steering apparatus.

As shown in FIG. 1, a steering wheel 2 is fixed to a steering shaft 3. The steering shaft 3 is connected to a rack 5 with a rack-and-pinion mechanism 4. Rotation of the steering shaft 3 caused by an operation of the steering wheel 2 is converted into linear reciprocation of the rack 5 by means of the rackand-pinion mechanism 4. Further, a steering angle of wheels 6 is changed based on the linear reciprocation of the rack 5, and the traveling direction of the vehicle is changed.

The vehicle steering apparatus 1 is provided with a variable gear ratio actuator 7 serving as a variable transmission ratio device, and an IFSECU 8 controlling an actuation of the variable gear ratio actuator 7. The variable gear ratio actuator 7 is provided in a steering transmission system between the steering wheel 2 and the wheels 6. The variable gear ratio actuator 7 changes the transmission ratio (gear ratio), which is the ratio of the tire angle of the wheels 6 with respect to the steering angle (turning angle) of the steering wheel 2.

The steering shaft 3 includes a first shaft 9 to which the steering wheel 2 is coupled, and a second shaft 10 coupled to the rack-and-pinion mechanism 4. The variable gear ratio actuator 7 is provided with a differential mechanism 11 coupling the first shaft 9 and the second shaft 10, and a motor 12 driving the differential mechanism 11. The variable gear ratio actuator 7 transmits a motion obtained by superimposing a rotation generated by the actuation of the motor on a rotation of the first shaft 9 based on the operation of the steering wheel 2. Accordingly, the rotating speed of the steering shaft 3 input to the rack-and-pinion mechanism 4 is increased or decreased.

Figure 2:
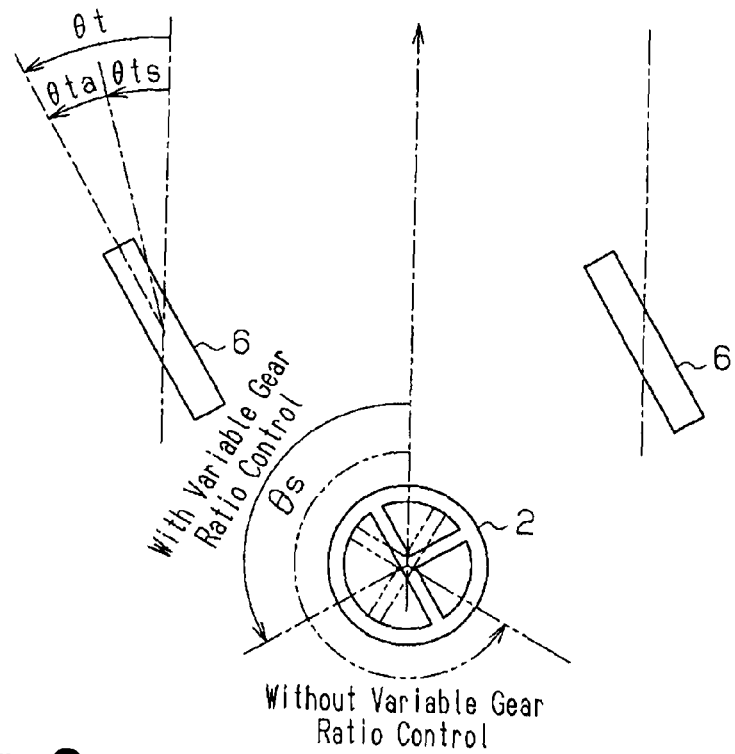
FIG. 2 is an explanatory view of a variable gear ratio control.
Figure 3:
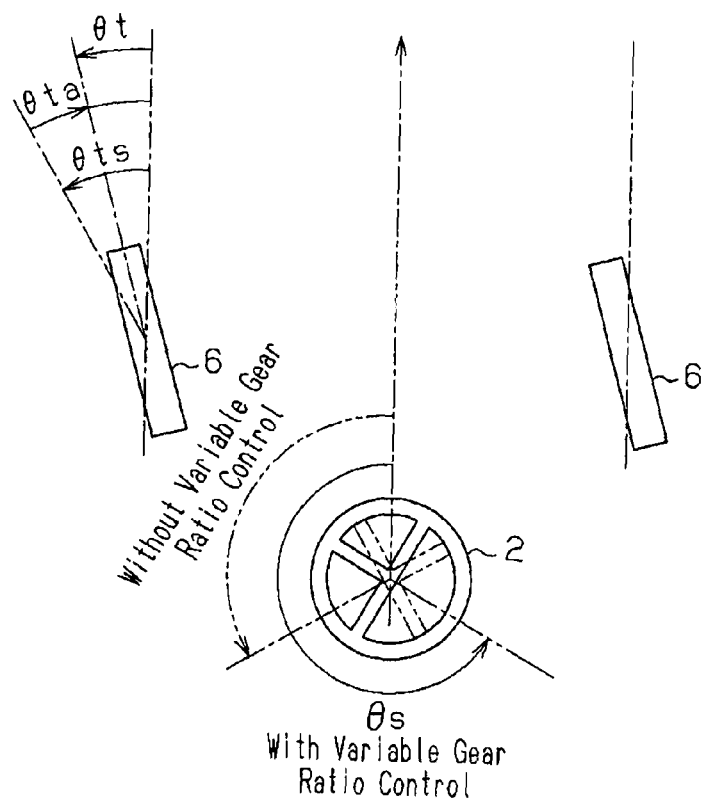
FIG. 3 is an explanatory view of the variable gear ratio control.

As shown in FIGS. 2 and 3, the variable gear ratio actuator 7 superimposes a steering angle (an ACT angle θta) of the wheels 6 based on the actuation the motor on a steering angle (basic steering angle θts) of the wheels 6 based on operation of the steering wheel 2. Accordingly, the variable gear ratio actuator 7 changes the ratio of the tire angle θt of the wheels 6 with respect to the turning angle θs of the steering wheel 2. The IFSECU 8 controls the variable gear ratio actuator 7 through supply of a driving electric power to the motor 12. Therefore, the IFSECU 8 executes a variable gear ratio control controlling the transmission ratio between the steering wheel turning angle θs and the tire angle θt.

The term "to superimpose" includes not only to add, but also to subtract. In the case where "gear ratio of the tire angle θt to the steering wheel turning angle θs" is expressed by an overall gear ratio (steering wheel turning angle θs/tire angle θt), the tire angle θt becomes larger by superimposing the ACT angle θta in the same direction on the basic steering angle θts, and the overall gear ratio becomes smaller, as shown in FIG. 2. On the other hand, the tire angle θt becomes smaller by superimposing the ACT angle θta in the opposite direction on the basic steering angle θts, and the overall gear ratio becomes larger, as shown in FIG. 3. The basic steering angle θcorresponds to a first steering angle, and the ACT angle θta corresponds to a second steering angle.

Further, as shown in FIG. 1, the vehicle steering apparatus 1 is provided with an EPS actuator 17 serving as a steering force assist device, and an EPSECU 18 (an assist force control apparatus) serving as control means for controlling the actuation of the EPS actuator 17. The EPS actuator 17 applies an assist force for assisting the operation of the steering wheel 2 to the steering system of the vehicle.

The EPS actuator 17 is a rack assist type EPS actuator which is provided with a motor 22 serving as a driving source in the rack 5. The EPS actuator 17 transmits an assist torque generated in the motor 22 to the rack 5 via a ball screw mechanism (not shown). The EPSECU 18 executes a power assist control controlling the assist force applied to the steering system, by controlling the assist torque generated in the motor 22.

The IFSECU 8 and the EPSECU 18 are connected to each other via a controller area network (CAN) 23. A plurality of sensors for detecting a state quantity of the vehicle are connected to the controller area network 23. Specifically, to the controller area network 23, there are connected a steering wheel turning angle sensor 24, a torque sensor 25, vehicle wheel speed sensors 26a and 26b, a lateral G sensor 28, a vehicle speed sensor 29, a brake sensor 30, a yaw rate sensor 31 and the like. State quantity of the vehicle detected by the respective sensors, that is, a steering wheel turning angle θs, a steering torque τ, vehicle wheel speeds Vtr and Vtl, a tire angle θt, a vehicle speed V, a brake signal Sbk, a lateral acceleration Fs, a yaw rate Ry and a slip angle θsp are input to the IFSECU 8 and the EPSECU 18 via the controller area network 23.

The tire angle θt of the wheels 6 is determined by adding an ACT angle θta to a value obtained by multiplying the turning angle θs of the steering wheel 2 by a base gear ratio of the rack-and-pinion mechanism 4, that is, a basic steering angle θts. The slip angle θsp is determined based on a lateral acceleration Fs detected by the lateral G sensor 28 and the yaw rate Ry. Further, the IFSECU 8 and the EPSECU 18 send and receive control signals via the controller area network 23. The IFSECU 8 and the EPSECU 18 execute a variable gear ratio control and a power assist control based on the state quantity of the vehicle and the control signals which are input via the controller area network 23.

Next, a description will be given of an electric structure and the control of the steering apparatus mentioned above.

As shown in FIG. 4, the IFSECU 8 is provided with a microcomputer 33 outputting a motor control signal, and a drive circuit 34 supplying a driving power to the motor 12 based on the motor control signal. A brushless motor is employed as the motor 12 corresponding to the driving source of the variable gear ratio actuator 7. The drive circuit 34 supplies three-phase (U, V, W) driving power to the motor 12 based on the motor control signal input from the microcomputer 33.

The microcomputer 33 is provided with an IFS control calculation unit 35, a variable gear ratio control calculation unit 36, and a LeadSteer control calculation unit 37. Each of the control calculation units 35 to 37 computes a control component and a control signal of an ACT angle θta in correspondence to the purpose, based on a state quantity of a vehicle input to each of the calculation units. The microcomputer 33 generates a motor control signal for controlling the actuation of the motor 12, that is, the variable gear ratio actuator 7, based on each of the computed control components.

The IFS control calculation unit 35 receives a steering wheel turning angle θs, a tire angle θt, a vehicle speed V, vehicle wheel speeds Vtr and Vtl, a brake signal Sbk, a lateral acceleration Fs, a yaw rate Ry, and a slip angle θsp. The IFS control calculation unit 35 executes an active steering function based on these state quantities. In other words, the IFS control calculation unit 35 computes the control component of the ACT angle θta for controlling the yaw moment based on the vehicle model. Further, the IFS control calculation unit 35 executes an IFS control calculation carrying out the calculation of relevant control signals.

The IFS control calculation unit 35 determines the steering characteristic of the vehicle based on the input state quantities. The IFS control calculation unit 35 computes an IFS_ACT command angle θifs* and a US control gain Kus as a control component of the ACT angle θta for achieving an active steering function in correspondence to the steering characteristic.

The IFS_ACT command angle θifs* is a control component mainly corresponding to a case where the steering characteristic of the vehicle is oversteer (OS). The microcomputer 33 executes oversteer control to change the ACT angle θta, thereby applying a steering angle in an opposite direction to a direction of the yaw moment, that is, a countersteer, based on the IFS_ACT command angle θifs*. The US control gain Kus is a control gain for reducing the change amount of the tire angle θt of the wheels 6 with respect to a turning operation of the steering wheel 2, in the case where the steering characteristic is understeer (US). The IFS control calculation unit 35 outputs the US control gain Kus to the variable gear ratio control calculation unit 36. The absolute value of the control component computed by the variable gear ratio control calculation unit 36 is reduced by the US control gain Kus, and the understeer control mentioned above is executed.

The IFS_ACT command angle θifs* and the US control gain Kus are input to the EPSECU 18 together with an OS/US characteristic value Val_st indicating the result of determination of the steering characteristic (refer to FIG. 1). The EPSECU 18 executes a power assist control acting in concert with the active steering control mentioned above, based on these control signals.

The steering wheel turning angle θs, the tire angle θt, and the vehicle speed V are input to the variable gear ratio control calculation unit 36. The variable gear ratio control calculation unit 36 executes a variable gear ratio control calculation computing the gear ratio variable ACT command angle θgr* as the control component for varying the gear ratio in correspondence to the vehicle speed V, based on these state quantities and the control signal.

The vehicle speed V and a steering wheel turning speed ωs are input to the LeadSteer control calculation unit 37. The steering wheel turning speed ωs is computed by differentiating the steering wheel turning angle θs (the same applies in the following). The LeadSteer control calculation unit 37 executes a LeadSteer control calculation computing an LS_ACT command angle θls* as the control component for improving the response of the vehicle, in correspondence to the steering wheel turning speed, based on the vehicle speed V and the steering wheel turning speed ωs.

The IFS control calculation unit 35, the variable gear ratio control calculation unit 36, and the LeadSteer control calculation unit 37 output the respective computed control components, that is, the IFS_ACT command angle θifs*, the gear ratio variable ACT command angle θgr*, and the LS_ACT command angle θls* to an adder 38a. The adder 38a computes an ACT command angle θta*, which is a control target of the ACT angle θta, by adding up the IFS_ACT command angle θifs*, the variable gear ratio ACT command angle θgr*, and the LS_ACT command angle θls*.

The ACT command angle θta* is input to each of an F/F control calculation unit 39 and an F/B control calculation unit 40. The motor 12 is provided with a rotation angle sensor 41. The ACT angle θta detected by the rotation angle sensor 41 is input to the F/B control calculation unit 40. The F/F control calculation unit 39 executes a feedforward calculation based on the input ACT command angle θta* so as to compute a control amount εff. Further, the F/B control calculation unit 40 executes a feedback calculation based on the ACT command angle θta* and the ACT angle θta so as to compute a control amount εfb.

The F/F control calculation unit 39 and the F/B control calculation unit 40 output the control amount εff and the control amount εfb to an adder 38b. The adder 38b computes a current command by adding up the control amount εff and the control amount εfb. The adder 38b outputs the current command to a motor control signal output unit 42. The motor control signal output unit 42 generates a motor control signal based on the input current command so as to output it to the drive circuit 34. Each of control blocks in FIG. 4 is controlled in accordance with a computer program which is executed by an information processor provided in each of the IFSECU 8 and the EPSECU 18.

As shown in the flowchart in FIG. 5, the microcomputer 33 first receives sensor values as state quantities of the vehicle from each of the sensors (step 101), executes the IFS control calculation (step 102), subsequently executes a variable gear ratio control calculation (step 103), and executes a LeadSteer control calculation (step 104). The microcomputer 33 computes the ACT command angle θta*, which is the control target of the ACT angle θta, by adding up an IFS_ACT command angle θifs*, a variable gear ratio ACT command angle θgr*, and an LS_ACT command angle θls*, which have been computed by the respective calculation processes in steps 102 to 104.

Next, the microcomputer 33 computes a current command by executing a feedforward calculation (step 105) and a feedback calculation (step 106) based on the ACT command angle θta*. Further, the microcomputer 33 outputs a motor control signal based on the current command (step 107).

Further, the EPSECU 18 is also provided with a microcomputer 43 and a drive circuit 44 in the same manner as the IFSECU 8. In the present embodiment, the brushless motor is employed also in the motor 22, which is the driving source of the EPS actuator 17. The drive circuit 44 supplies three-phase (U, V, W) driving power to the motor 22 based on the motor control signal input from the microcomputer 43.

The microcomputer 43 is provided with an assist control unit 45, a torque inertia compensation control unit 46, a steering wheel return control unit 47, and a damper compensation control unit 48. Each of the control units 45 to 48 computes a control component of an assist torque generated in the motor 22, based on the state quantity input to each of the control units.

A steering torque τ and the vehicle speed V are input to the assist control unit 45. The assist control unit 45 computes a basic assist current command Ias* as a basic control component of an assist force, based on the steering torque τ and the vehicle speed V. The greater (the absolute value of) the steering torque τ is, and the slower the vehicle speed V is, the greater the computed basic assist current command Ias* becomes.

A steering torque differential value dτ corresponding to a differential value of the steering torque τ and the vehicle speed V are input to the torque inertia compensation control unit 46. The torque inertia compensation control unit 46 computes an inertia compensation current command Iti* as a control component for compensating an influence caused by the inertia of the EPS.

"Torque inertia compensation control" is a control for suppressing "catching feeling (response lag)" at a time of "starting turning", and "carried-away feeling (overshoot)" at a time of "finishing turning", in the operation of the steering wheel 2 generated by the inertia of the motor, the actuator or the like. The torque inertia compensation control suppresses vibration of the steering system generated by a reverse input to the wheels 6.

The vehicle speed V, the steering torque τ and the tire angle θt are input to the steering wheel return control unit 47. The steering wheel return control unit 47 computes a steering wheel return current command Isb* based on each of the state quantities. The steering wheel return current command Isb* is a control component for improving the return characteristic of the steering wheel 2.

The vehicle speed V and the steering wheel turning speed ωs are input to the damper compensation control unit 48. The damper compensation control unit 48 computes a damper compensation current command Idp* based on the steering wheel turning speed ωs and the vehicle speed V. The damper compensation current command Idp* is a compensation component for damping the steering wheel turning speed ωs. The damper compensation component is a control component for improving the steering characteristic, and suppressing the steering angle from becoming excess mainly at a time of traveling at a high speed.

The microcomputer 43 is provided with an IFS torque compensation control unit 49 in addition to each of the control units mentioned above. The IFS torque compensation control unit 49 computes an IFS torque compensation gain Kifs for executing a power assist control acting in concert with an active steering control, thereby improving the steering feel during the active steering control.

The IFS torque compensation control unit 49 receives an IFS_ACT command angle θifs*, a US control gain Kus, an OS/US characteristic value Val_st and the like output from the IFSECU 8 via the controller area network 23, together with the steering wheel turning angle θs and the steering wheel turning speed ωs. The IFS torque compensation control unit 49 computes the IFS torque compensation gain Kifs based on the input state quantities and the control signals.

At the time of oversteer, the IFS torque compensation control unit 49 computes the IFS torque compensation gain Kifs so as to execute the application of an assist force for prompting the driver to a countersteer. On the other hand, at the time of understeer, the IFS torque compensation control unit 49 computes the IFS torque compensation gain Kifs so as to execute the application of an assist force for suppressing the larger steering wheel turning angle than the current one from being generated. The IFS torque compensation gain Kifs is input to a multiplier 50 together with the basic assist current command Ias* computed in the assist control unit 45.

The multiplier 50 corrects the basic assist current command Ias* by multiplying the basic assist current command Ias* by the IFS torque compensation gain Kifs. The corrected basic assist current command Ias is input to an adder 51** together with the inertia compensation current command Iti*, the steering wheel return current command Isb*, and the damper compensation current command Idp*. The adder 51 computes the current command corresponding to a control target of the assist torque generated in the motor 22, by adding the control components to the basic assist current command Ias**.

The current command computed in the adder 51 is input to the motor control signal output unit 52. Further, the motor control signal output unit 52 receives an actual current detected by the current sensor 53, and a rotation angle detected by the rotation sensor 54. The motor control signal output unit 52 carries out a feedback control based on the input current command, the actual current, and the rotation angle. Accordingly, the motor control signal output unit 52 generates the motor control signal and sends it to the drive circuit 44.

As shown in the flowchart in FIG. 6, the microcomputer 43 first receives the sensor values as the state quantities of the vehicle from the sensors (step 201), and executes an assist control calculation (step 202). Next, the microcomputer 43 executes a torque inertia compensation control calculation (step 203), a steering wheel return control calculation (step 204) and a damper compensation control calculation (step 205), and subsequently executes an IFS torque compensation control calculation (step 206).

Next, the microcomputer 43 corrects the basic assist current command Ias* by multiplying the basic assist current command Ias* calculated by the assist control calculation in step 202 by the IFS torque compensation gain Kifs calculated in step 206. The microcomputer 43 calculates the current command, which is the control target, by adding the inertia compensation current command Iti*, the steering wheel return current command Isb* and the damper compensation current command Idp*, which are calculated by the respective calculation processes in steps 203 to 205, to the corrected basic assist current command Ias. The microcomputer 43 outputs the motor control signal based on the calculated current command (step 207**).

Next, a description will be given in detail of the IFS control calculation process at the IFS control calculation unit 35.

Figure 7:
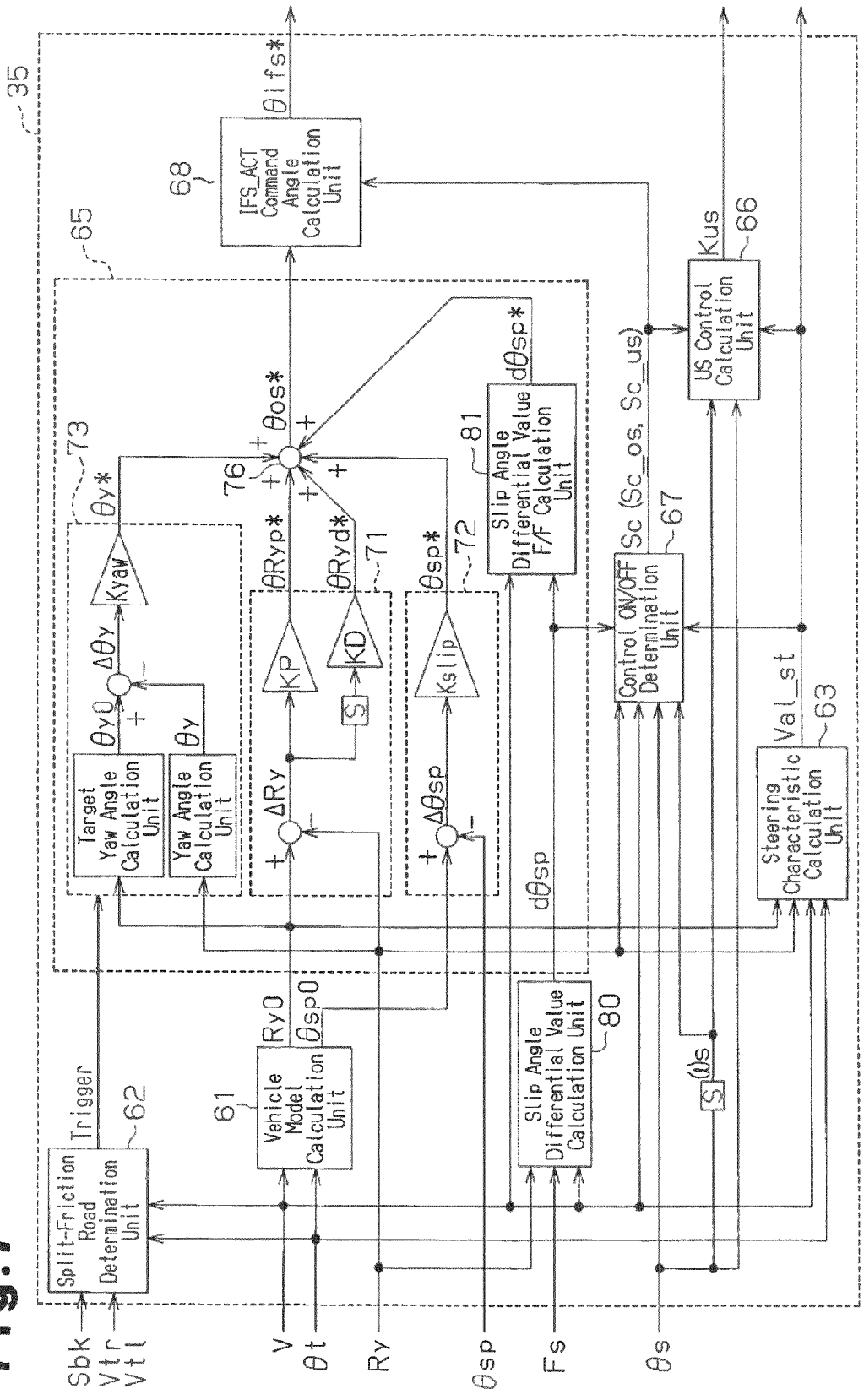
FIG. 7 is a control block diagram of an IFS control calculation unit.

As shown in FIG. 7, the IFS control calculation unit 35 is provided with a vehicle model calculation unit 61, a split-friction road determination unit 62, a steering characteristic calculation unit 63, an OS control calculation unit 65, a US control calculation unit 66, a control ON/OFF determination unit 67, and an IFS_ACT command angle calculation unit 68.

The tire angle θt and the vehicle speed V are input to the vehicle model calculation unit 61. The vehicle model calculation unit 61 computes a target value of the state quantity which is relevant to the yaw moment of the vehicle by executing the vehicle model calculation based on the tire angle Et and the vehicle speed V. In other words, the vehicle model calculation unit 61 computes a target yaw rate Ry0 and a target slip angle θsp0 corresponding to the target state quantity. With regard to the above-mentioned vehicle model calculation which computes the target yaw rate Ry0 and the target slip angle θsp0 from the tire angle θt and the vehicle speed V based on the vehicle model, for example, refer to Japanese Laid-Open Patent Publication No. 2002-254964, and the like.

The vehicle wheel speeds Vtr and Vtl, the tire angle θt, the vehicle speed V, and the brake signal Sbk are input to the split-friction road determination unit 62. The split-friction road determination unit 62 determines whether the right and left wheels of the vehicle exist on two road surfaces having significantly different friction resistances based on the state quantities. The split-friction road determination unit 62 executes a split-friction road determination for determining whether the vehicle is braked in a split state in which the friction coefficients μ of the road surface are different, that is, whether the vehicle is in a split μ braking state.

The steering characteristic calculation unit 63 serving as the steering characteristic determination means receives the tire angle θt, the vehicle speed V, the yaw rate Ry, and the target yaw rate Ry0 which is computed in the vehicle model calculation unit 61. The steering characteristic calculation unit 63 computes the steering characteristic of the vehicle, that is, which state of the oversteer, the understeer, and the neutral steer the vehicle exists in based on the state quantities. In other words, the steering characteristic calculation unit 63 executes a steering characteristic calculation computing an OS/US characteristic value Val_st indicating the steering characteristic. The OS/US characteristic value Val_st is computed based on the expression Val_st=(L×Ry/V−θt)×Ry, in which L represents the wheel base, so as to be output as an analogue signal.

The OS control calculation unit 65 is provided with a yaw rate F/B calculation unit 71, and a slip angle F/B calculation unit 72. The yaw rate F/B calculation unit 71 and the slip angle F/B calculation unit 72 execute a feedback calculation so as to make the actual value of the corresponding state quantity seek the target value. The OS control calculation unit 65 computes a control target component of the ACT angle θta in the case where the steering characteristic is oversteer, based on the feedback calculation in each of the F/B calculation units. In other words, the OS control calculation unit 65 executes an OS control calculation computing the OS control ACT command angle $\theta os^*$ as the control target component for generating the steering angle (the countersteer) in the direction opposite to the yaw moment.

The yaw rate Ry and the target yaw rate Ry0 are input to the yaw rate F/B calculation unit 71. The yaw rate F/B calculation unit 71 executes the yaw rate F/B calculation for executing the feedback calculation based on the deviation $\Delta Ry$ between the yaw rate Ry and the target yaw rate Ry0. Specifically, the yaw rate F/B calculation unit 71 computes a yaw rate proportional F/B command angle $\theta Ryp^*$ by multiplying the deviation $\Delta Ry$ by a proportional F/B gain KP. Further, the yaw rate F/B calculation unit 71 computes a yaw rate differential F/B command angle $\theta Ryd^*$ by multiplying the differential amount of the deviation $\Delta Ry$ by a differential F/B gain KD. In the same manner, the slip angle $\theta sp$ and the target slip angle $\theta sp0$ are input to the slip angle F/B calculation unit 72. The slip angle F/B calculation unit 72 executes the slip angle F/B calculation to compute the slip angle F/B command angle $\theta sp^*$ by multiplying the deviation $\Delta \theta sp$ between the slip angle $\theta sp$ and the target slip angle $\theta sp0$ by the slip angle F/B gain Kslip.

The OS control calculation unit 65 is provided with a yaw angle F/B calculation unit 73 in addition to the yaw rate F/B calculation unit 71 and the slip angle F/B calculation unit 72. The yaw angle F/B calculation unit 73 computes a control component for securing stability at the time of the split μ braking. The yaw angle F/B calculation unit 73 executes the yaw angle F/B calculation based on the target yaw angle $\theta y0$ and the yaw angle $\theta y$ by using the result of determination in the split-friction road determination unit 62 as a trigger. The yaw angle F/B calculation unit 73 computes the yaw angle F/B command angle $\theta y^*$ by multiplying a deviation $\Delta \theta y$ between the target yaw angle $\theta y0$ and the yaw angle $\theta y$ by the yaw angle gain Kyaw.

An adder 76 receives the yaw rate proportional F/B command angle $\theta Ryp^*$ and the yaw rate differential F/B command angle $\theta Ryd^*$, which are computed in the yaw rate F/B calculation unit 71, the slip angle F/B command angle $\theta sp^*$, which is computed in the slip angle F/B calculation unit 72, and the yaw angle F/B command angle $\theta y^*$, which is computed in the yaw angle F/B calculation unit 73. Further, the adder 76 receives a slip angle differential value F/F command angle $d\theta sp^*$, which is computed in a slip angle differential value F/F calculation unit 81 mentioned below. The OS control calculation unit 65 executes an OS control calculation computing an OS control ACT command angle $\theta os^*$ by adding each of the control target components in the adder 76.

The US control calculation unit 66 receives the steering wheel turning angle $\theta s$ and the steering wheel turning speed $\omega s$, and the OS/US characteristic value Val_st, which is computed in the steering characteristic calculation unit 63. The US control calculation unit 66 executes a US control calculation computing a US control gain Kus based on the state quantities.

The control ON/OFF determination unit 67 serves as determination means for determining when to start the oversteer control (OS control) based on the OS control ACT command angle $\theta os^*$, which is computed by the OS control calculation unit 65, and the understeer control (US control) based on the US control time ACT command angle $\theta us^*$, which is computed by the US control calculation unit 66, that is, the active steering control.

The control ON/OFF determination unit 67 receives various state quantities and control signals such as the OS/US characteristic value Val_st and the like which are computed in the steering characteristic calculation unit 63. The control ON/OFF determination unit 67 determines when to start the active steering control based on the state quantities and the control signals. The control ON/OFF determination unit 67 executes the control ON/OFF determination to output a result of determination as a control ON/OFF signal Sc. In the present embodiment, the control ON/OFF signal Sc relating to the OS control is output as an OS control signal Sc_os in the control ON/OFF determination unit 67, and the control ON/OFF signal Sc relating to the US control is output as a US control signal Sc_us.

The IFS_ACT command angle calculation unit 68 receives the OS control ACT command angle $\theta os^*$ which is computed by the OS control calculation unit 65, and the control ON/OFF signal Sc (the OS control signal Sc_os) output by the control ON/OFF determination unit 67. The IFS_ACT command angle calculation unit 68 executes an IFS_ACT command angle calculation outputting the OS control ACT command angle $\theta os^*$ as the IFS_ACT command angle $\theta ifs^*$, in the case where the input control ON/OFF signal Sc indicates "OS control ON".

Figure 8:
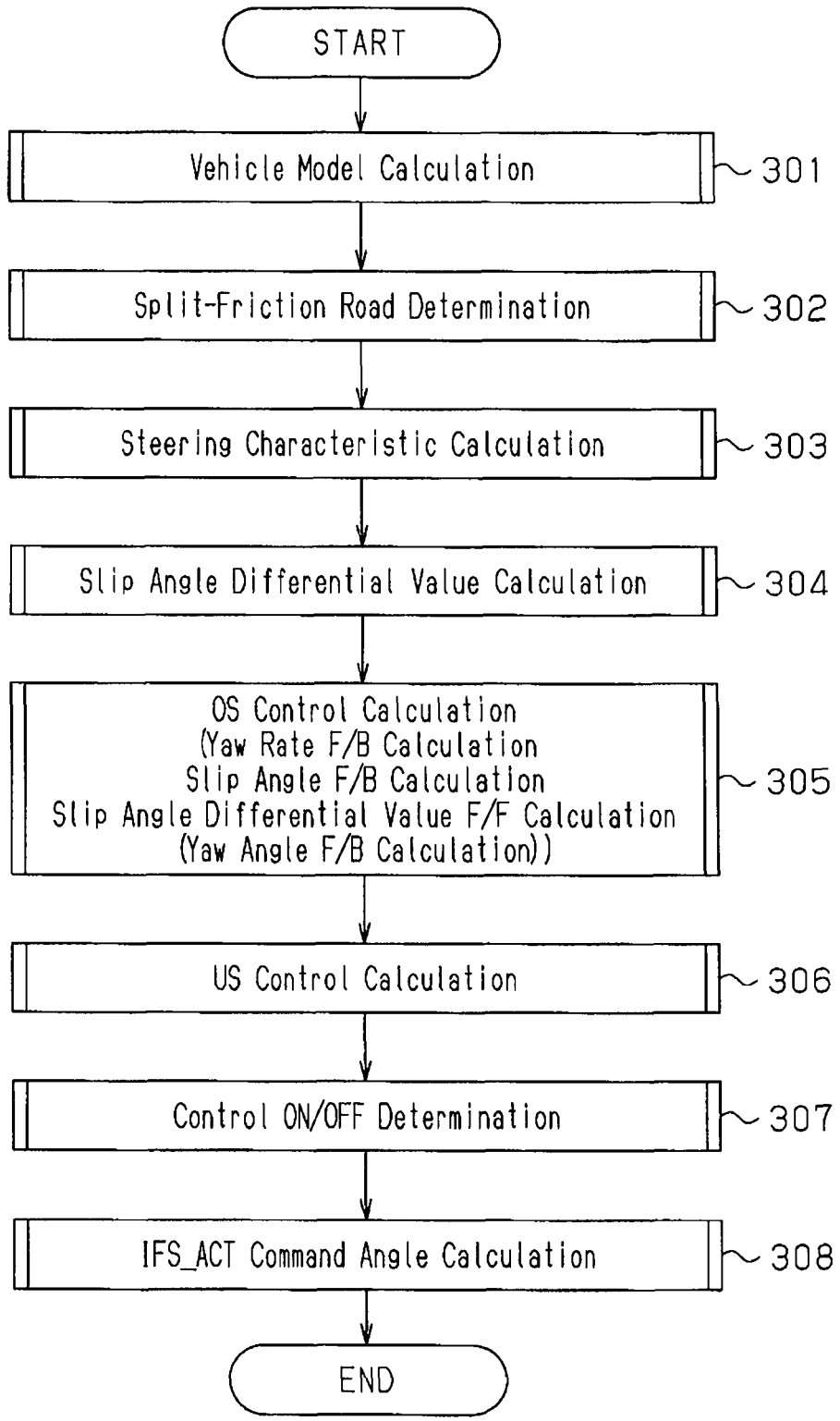
FIG. 8 is a flowchart showing a procedure of an IFS control calculation.

In other words, as shown in the flowchart in FIG. 8, the IFS control calculation unit 35 first executes the vehicle model calculation (step 301), and next executes the split-friction road determination (step 302). Next, the IFS control calculation unit 35 executes the steering characteristic calculation (step 303), and executes a slip angle differential value calculation mentioned below (step 305).

Next, the IFS control calculation unit 35 executes the OS control calculation computing the OS control ACT command angle $\theta os^*$ by computing the slip angle differential value F/F based on the slip angle differential value, as well as carrying out the yaw rate F/B calculation and the slip angle F/B calculation based on the target yaw rate Ry0 and the target slip angle $\theta sp0$, which are computed in the vehicle model calculation of step 301 (step 306). In the case where it is determined in step 302 that the split μ braking state is generated, the yaw angle F/B calculation unit 73 executes the yaw angle F/B calculation by using the result of determination as a trigger.

Subsequently, the IFS control calculation unit 35 computes the US control gain Kus by executing the US control calculation (step 307). Further, the IFS control calculation unit 35 executes the control ON/OFF determination (step 306). Further, the IFS control calculation unit 35 executes an IFS_ACT command angle calculation outputting the IFS_ACT command angle $\theta ifs^*$ as the control target component for achieving the active steering function based on the result of determination of the control ON/OFF determination (step 308). In the case where the result of the control ON/OFF determination indicates that the US control should be started, the IFS control calculation unit 35 outputs the US control gain Kus which is computed by the execution of the US control calculation.

(Determination of Start of Active Steering Control)

Next, a description will be given of a method of determining when to start the active steering control.

As mentioned above, in the structure determining when to start the active steering control based on the yaw rate of the vehicle, there is a tendency that the start of the active steering control is delayed under such a condition that a friction coefficient μ of a road surface is extremely low, for example, a frozen road or the like. Further, in accordance with the determination based on the differential value of the slip angle of the vehicle, it is possible to quickly detect that the attitude of the vehicle is unstable, but there is a problem that a lot of erroneous determinations are generated.

Taking this into consideration, the IFSECU 8 (the microcomputer 33) in accordance with the present embodiment determines when to start the active steering control based on the differential value of the slip angle, after excluding conditions in which the erroneous determination tends to be generated. Accordingly, it is possible to detect that the attitude of the vehicle is unstable quickly and accurately, and the active steering control for stabilizing the attitude of the vehicle is quickly executed.

As shown in FIG. 7, the IFS control calculation unit 35 is provided with a slip angle differential value calculation unit 80 computing the slip angle differential value dθsp. The control ON/OFF determination unit 67 determines when to start the active steering control, in detail the oversteer control, based on the state quantities and the control signals. The lateral acceleration Fs, the yaw rate Ry, and the vehicle speed V are input to the slip angle differential value calculation unit 80. The slip angle differential value calculation unit 80 computes the slip angle differential value dθsp based on the following expression (1).

$$d\theta sp = Ry - (Fs/V) \quad (1)$$

The control ON/OFF determination unit 67 receives the yaw rate Ry, the vehicle speed V, the steering wheel turning angle θs, and the steering wheel turning speed ωs, in addition to the slip angle differential value dθsp, and the OS/US characteristic value Val_st, which is computed in the steering characteristic calculation unit 63. The control ON/OFF determination unit 67 determines that the oversteer control should be started, in the case where all the following determination conditions using the respective state quantities are satisfied:

the absolute value of the slip angle differential value dθsp is equal to or greater than a predetermined threshold value α;

the sign of the slip angle differential value dθsp is identical with the sign of the yaw rate Ry;

the sign of the steering wheel turning angle θs is identical with the sign of the steering wheel turning speed ωs; and the vehicle speed V is equal to or greater than a predetermined threshold value V0.

The "yaw rate Ry", which is a first term of the expression (1) mentioned above, indicates "rotation" of the vehicle, and "lateral acceleration Fs/vehicle speed V", which is a second term, indicates "orbital motion" of the vehicle. Accordingly, it is possible to instantaneously detect that the attitude of the vehicle is unstable by monitoring the balance of "rotation" and "orbital motion" of the vehicle.

In many cases, a low-pass filter is applied as a filter treatment to each of the state quantities used for the various controls of the vehicle, to reduce noise. This is similarly applied to the yaw rate Ry and the lateral acceleration Fs, which are used in the expression (1) mentioned above. However, the application of the filter treatment generates a phase delay in the signal indicating the detected yaw rate Ry and the lateral acceleration Fs by applying the filter treatment. The phase delay can be a cause of erroneous determinations in the case of using the expression (1) mentioned above.

In the present embodiment, it is determined "whether the sign of the slip angle differential value dθsp is identical with the sign of the yaw rate Ry" so as to exclude erroneous determinations caused by the phase delay at the time of the filter treatment. In the case where the signs of two state quantities indicating "rotation and slip direction of vehicle" are opposed to each other, the generation of erroneous determinations is avoided by not carrying out the determination that the oversteer control should be started, while taking into consideration the influence of the phase delay.

Further, the influence of the phase delay becomes more significant especially at a time of "turning back steering" when the steering direction is switched. Taking this into consideration, in accordance with the present embodiment, it is determined "whether the sign of the steering wheel turning angle θs is identical with the sign of the steering wheel turning speed ωs". Further, at a time when the turning back steering is generated, the generation of erroneous determinations is avoided by not carrying out the determination that the oversteer control should be started.

Basically, it is possible to detect that the attitude of the vehicle is unstable in an earlier stage than the driver does by using the expression (1) mentioned above. However, there is a case where a driver carries out the countersteering operation prior to such detection. In this case, since the oversteer control is started after a delay, the amount of the countersteering operation becomes excessive, accordingly. As a result, there is a risk that the attitude of the vehicle becomes unstable. However, in accordance with the structure mentioned above, in the case where the driver carries out the countersteering operation quickly and appropriately, the oversteer control is not carried out. Accordingly, it is possible to achieve a superior steering characteristic, and a good steering feel.

The second term of the expression (1) mentioned above is a common fraction in which the vehicle speed V is set to a denominator. Accordingly, in the case where the vehicle speed V is very small, the value of the second term becomes extremely large. Accordingly, the possibility that erroneous determination is generated becomes extremely high. Further, in the present embodiment, it is determined "whether the vehicle speed V is equal to or greater than the predetermined threshold value V0". In the case where the vehicle speed V is less than the predetermined threshold value V0, the generation of erroneous determinations is avoided by not carrying out the determination that the oversteer control should be started. In a range in which the vehicle speed is very small, the attitude of the vehicle is basically stable. Accordingly, it is possible to presume that a demerit caused by not executing the oversteer control is small.

Next, a description will be given of a procedure of the OS control start determination by the control ON/OFF determination unit.

Figure 9:
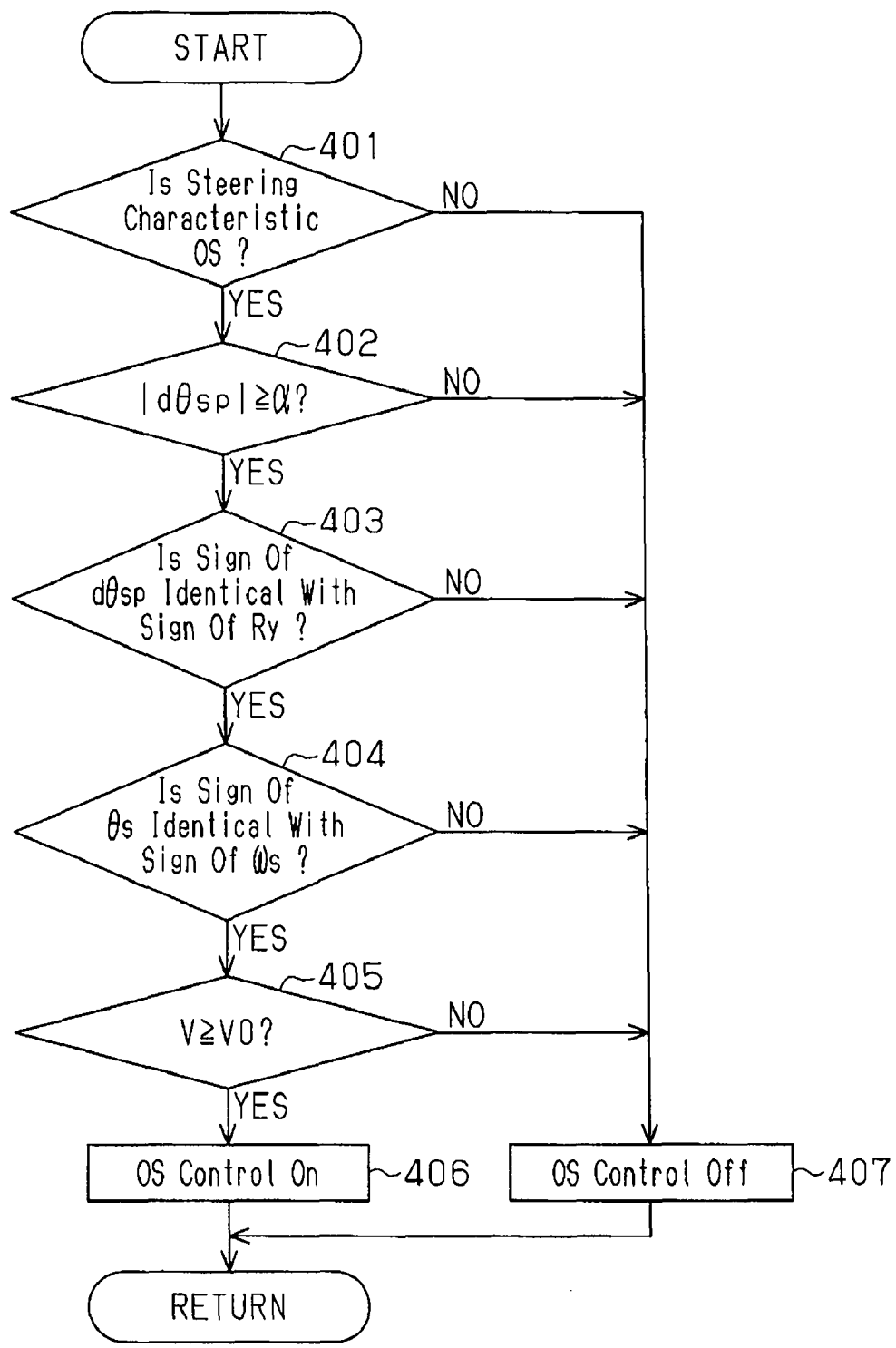
FIG. 9 is a flowchart showing a processing procedure of an OS control start determination.

As shown in the flowchart in FIG. 9, the control ON/OFF determination unit 67 first determines whether the input OS/US characteristic value Val_st indicates oversteer (step 401). In the case of determining that oversteer is indicated (YES in step 401), the control ON/OFF determination unit 67 determines whether the absolute value of the slip angle differential value dθsp is equal to or greater than a predetermined threshold value α (step 402). In the case of determining that the absolute value of the slip angle differential value dθsp is equal to or greater than the predetermined threshold value α (|dθsp|≧α, YES in step 402), the control ON/OFF determination unit 67 determines whether the sign of the slip angle differential value dθsp is identical with the sign of the yaw rate Ry (step 403), determines whether the sign of the steering wheel turning angle θs is identical with the sign of the steering wheel turning speed ωs (step 404), and determines whether the vehicle speed V is equal to or greater than the predetermined threshold value V0 (step 405). In the case of satisfying all the respective determination conditions of steps 403 to 404 (YES in step 403, YES in step 404, and YES in step 405), the control ON/OFF determination unit 67 determines "OS control ON" (step 406).

In other words, in the case where the slip angle differential value dθsp is equal to or greater than the threshold value α, the sign of the slip angle differential value dθsp is identical with the sign of the yaw rate Ry, the sign of the steering wheel turning angle θs is identical with the sign of the steering wheel turning speed ωs, and the vehicle speed V is equal to or greater than the predetermined threshold value V0, the control ON/OFF determination unit 67 determines that the oversteer control should be started.

If the determination condition is not satisfied in any of steps 401 to 405 (NO in step 401, NO in step 402, NO in step 403, NO in step 404 or NO in step 405), the control ON/OFF determination unit 67 determines "OS control OFF".

As shown in FIG. 7, the OS control calculation unit 65 is provided with a slip angle differential value F/F calculation unit 81 in addition to the yaw rate F/B calculation unit 71, the slip angle F/B calculation unit 72, and the yaw angle F/B calculation unit 73. The slip angle differential value F/F calculation unit 81 computes the slip angle differential value F/F command angle dθsp* as the control component based on the slip angle differential value dθsp.

Figure 10:
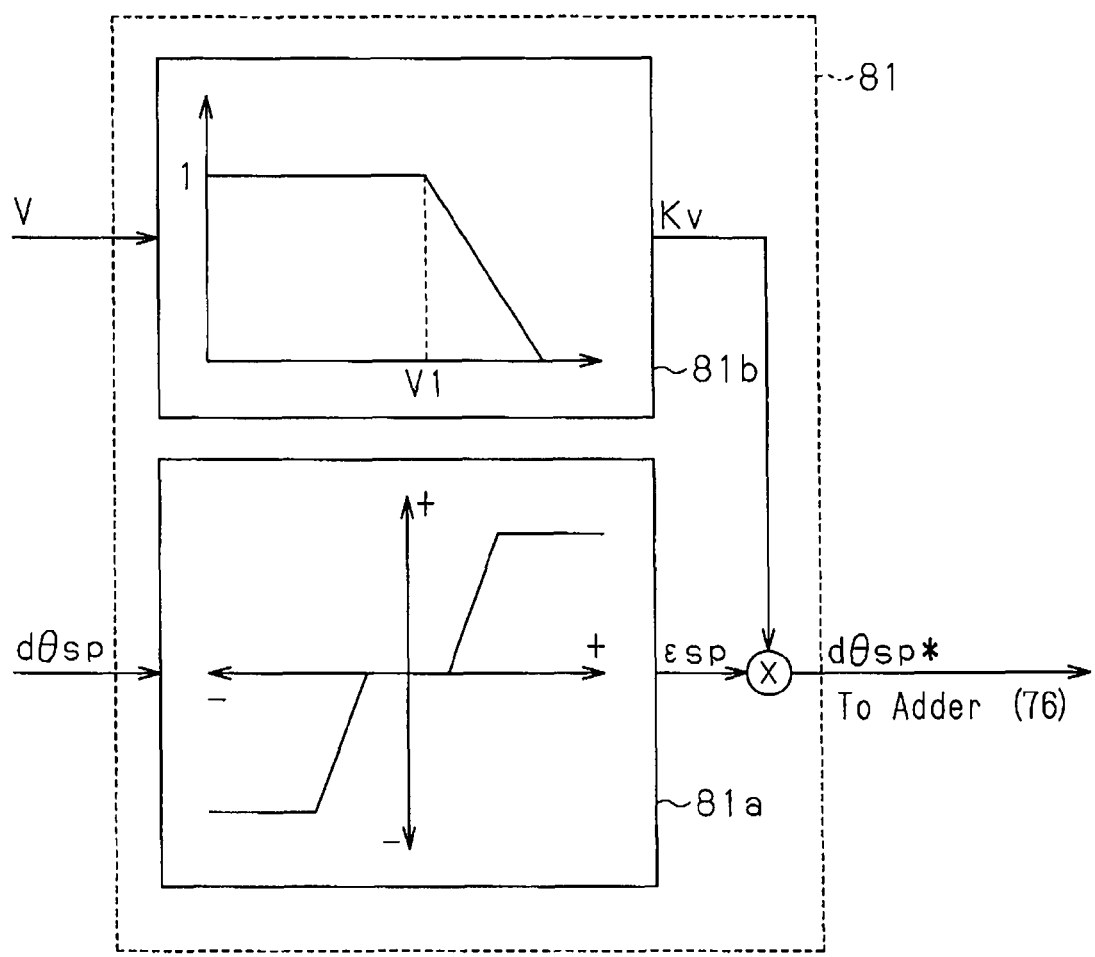
FIG. 10 is a control block diagram of a slip angle differential value F/F calculation unit.

As shown in FIG. 10, the slip angle differential value F/F calculation unit 81 is provided with a map 81a as a first map, in which the basic control amount εsp, which is a basic component of the slip angle differential value F/F command angle dθsp*, is associated with the slip angle differential value dθsp. In the map 81a, as the absolute value of the slip angle differential value dθsp becomes greater, the basic control amount εsp has a larger absolute value, and comes to the value having the same sign as the slip angle differential value dθsp. The slip angle differential value F/F calculation unit 81 computes the slip angle differential value F/F command angle dθsp* based on the basic control amount εsp determined by referring to the slip angle differential value dθsp input to the map 81a.

Specifically, the slip angle differential value F/F calculation unit 81 is provided with a map 81b as a second map, in which the vehicle speed V is associated with the vehicle speed gain Kv. The slip angle differential value F/F calculation unit 81 computes the vehicle speed gain Kv by referring to the map 81b. The slip angle differential value F/F calculation unit 81 computes the slip angle differential value F/F command angle dθsp* by multiplying the basic control amount εsp by the vehicle speed gain Kv. In the map 81b, in a range where the vehicle speed V is equal to or less than a predetermined threshold value V1, the vehicle speed gain Kv is "1". In contrast, in a range where the vehicle speed V exceeds the predetermined threshold value V1, the vehicle speed gain Kv becomes smaller as the vehicle speed becomes higher, and the vehicle speed gain Kv comes to "0" at the end.

As shown in FIG. 7, the slip angle differential value F/F command angle dθsp* computed by the slip angle differential value F/F calculation unit 81 is input to the adder 76 together with the yaw rate proportional F/B command angle θRyp*, the yaw rate differential F/B command angle θRyd*, the slip angle F/B command angle θsp* and the yaw angle F/B command angle θy*. Further, the slip angle differential value F/F command angle dθsp* is added as one control component constructing the OS control ACT command angle θos* to another control target component. Accordingly, the rising edge of the OS control ACT command angle θos* is advanced.

Figure 11:
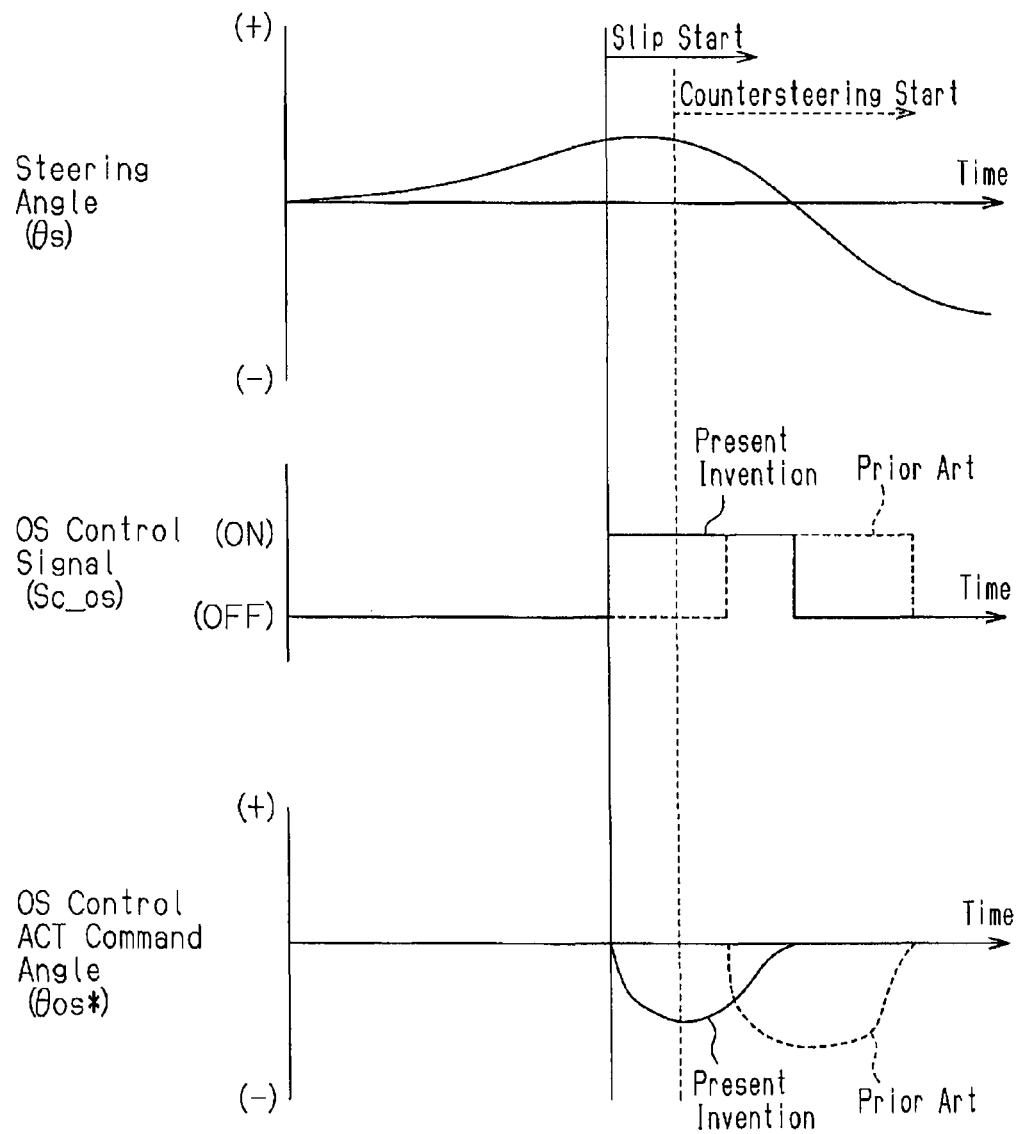
FIG. 11 is a view explaining an operation of an OS control start determination using the slip angle differential value.

In accordance with this structure, the timing at which the OS control signal Sc_os output by the control ON/OFF determination unit 67 comes to "ON" is advanced relative to the conventional one, and becomes approximately identical with the timing at which the vehicle starts slipping, that is, the timing at which the vehicle becomes unstable (refer to FIG. 11). Further, the slip angle differential value F/F command angle dθsp* based on the slip angle differential value dθsp is computed as a control amount for executing the oversteer control, that is, one control component constructing the OS control ACT command angle θos* output by the OS control calculation unit 65. Accordingly, it is possible to secure the OS control ACT command angle θos* at a sufficient amount from the control start time. Therefore, the attitude of the vehicle quickly becomes stable by a reduced OS control amount (counter amount). As a result, the control is returned to the normal control quickly.

As mentioned above, in accordance with the present embodiment, it is possible to obtain the following operations and advantages.

(1) In the case where the slip angle differential value dθsp is equal to or greater than the predetermined threshold value α, the sign of the slip angle differential value dθsp is identical with the sign of the yaw rate Ry, the sign of the steering wheel turning angle θs is identical with the sign of the steering wheel turning speed ωs, and the vehicle speed V is equal to or greater than the predetermined threshold value V0, the control ON/OFF determination unit 67 determines that the active steering control should be started.

As seen in the structure mentioned above, the active steering control is started by determining the attitude of the vehicle based on the slip angle differential value dθsp. Accordingly, the start timing of the active steering control is advanced. As a result, it is possible to quickly stabilize the attitude of the vehicle. Further, it is possible to determine when to start the active steering control based on the slip angle differential value, after excluding the condition that the erroneous determination tends to be generated. Accordingly, it is possible to further improve the accuracy of the determination.

In other words, erroneous determinations in the process of determining the attitude of the vehicle based on the slip angle differential value dθsp are caused by a phase delay which is generated by the filter treatment applied to the yaw rate Ry and the lateral acceleration Fs, based on which the slip angle differential value dθsp is computed. Accordingly, it is possible to avoid the generation of erroneous determinations by excluding the case where the signs of two state quantities (the slip angle differential value dθsp and the yaw rate Ry) indicating "rotating and slipping direction of vehicle", in which the phase delay is generated at a high possibility are opposed to each other.

Further, the influence of the phase delay becomes more significant especially at a time of "turning back steering" at which the steering direction is switched. Accordingly, it is possible to more effectively avoid the generation of erroneous determinations by excluding the turning back steering, that is, the case where the directions of the steering wheel turning angle θs and the steering wheel turning speed ωs are opposed to each other.

Further, the term in which the vehicle speed V is the denominator is included in the computing expression of the slip angle differential value dθsp. In other words, in the case where the vehicle speed V is extremely small, the value of the term becomes extremely large. Accordingly, the possibility that erroneous determinations are generated becomes extremely high. Therefore, it is possible to more effectively avoid the generation of erroneous determinations by excluding the case where the vehicle speed V is smaller than the predetermined threshold value V0.

(2) The control ON/OFF determination unit 67 execute the start determination of the oversteer control (OS control) as the start determination of the active steering control based on the slip angle differential value.

In other words, the OS control that changes the ACT angle θta in order to apply the steering angle (the countersteer) in the direction opposite to the direction of the yaw moment has the extremely great effect generated by advancing the start timing, and has the extremely great influence generated by the erroneous determination. Accordingly, it is possible to obtain the more significant effect by applying to the determination of the start of the oversteer control (OS control).

(3) The OS control calculation unit 65 is provided with the slip angle differential value F/F calculation unit 81. The slip angle differential value F/F calculation unit 81 computes the slip angle differential value F/F command angle dθsp* based on the slip angle differential value dθsp. In this case, the slip angle differential value F/F command angle dθsp* corresponds to one control component of the OS control ACT command angle θos* output as the control amount for executing the oversteer control.

In other words, there is a case where the start timing of the OS control determined based on the slip angle differential value becomes earlier than the timing at which the unstableness of the attitude of the vehicle comes to the surface as the yaw rate Ry and the slip angle θsp. However, in accordance with the structure mentioned above, it is possible to secure the sufficient amount of OS control ACT command angle θos* from the control start time point. Accordingly, it is possible to stabilize the attitude of the vehicle more quickly by a reduced counter amount. As a result, it is possible to return to the normal control quickly.

The present embodiment may be modified as follows.

In the illustrated embodiment, when to start the oversteer control (OS control) is determined as the start determination of the active steering control based on the slip angle differential value. However, a determination condition based on the slip angle differential value may be added to the determination of the start of the understeer control (US control).

In the illustrated embodiment, the determination of the start of the active steering control is automatically executed in the IFSECU 8. However, the structure is not limited to this, but the active steering control may be set to "OFF" based on the intention of the driver by a mechanical switch or the like.

In other words, there is a case where the driver carries out the countersteering when sensing unstableness of the attitude of the vehicle prior to the determination of the attitude of the vehicle based on the slip angle differential value. In this case, if the active steering control is executed, the amount of the countersteering may become excessive. In such a case, the driver positively carries out the operation of the steering wheel so as to set the steering characteristic to oversteer or understeer. Accordingly, there is a case where the active steering control becomes an obstacle to the driver. In this regard, in accordance with the structure mentioned above, it is possible to correspond to a wider range of users, while avoiding the problem mentioned above.

In accordance with the illustrated embodiment, the vehicle steering apparatus 1 is provided with the EPS actuator 17 having the motor 22 as the driving source, but the power assist apparatus may be of a hydraulic type. Further, the present invention may be embodied as a vehicle steering apparatus provided with no power assist apparatus.

The invention claimed is:

1. A vehicle steering apparatus comprising:
a variable transmission ratio device provided in a steering transmission system between a steering wheel and a vehicle wheel, wherein the variable transmission ratio device varies a ratio of a tire angle of the vehicle wheel to a turning angle of the steering wheel, by superimposing a first steering angle of the vehicle wheel based on operation of the steering wheel on a second steering angle of the vehicle wheel based on actuation of a motor mounted to a vehicle; and
control means for controlling actuation of the variable transmission ratio device,
wherein the control means executes an active steering control in which the control means automatically changes the second steering angle so as to stabilize an attitude of the vehicle, and
wherein the control means starts the active steering control when a slip angle differential value is equal to or greater than a predetermined threshold value for the slip angle differential value, a sign of the slip angle differential value is identical with a sign of a yaw rate, a sign of the steering wheel turning angle is identical with a sign of a steering wheel turning speed, and a vehicle speed is equal to or greater than a predetermined threshold value for the vehicle speed.

2. The vehicle steering apparatus according to claim 1, wherein the control means computes a first control component based on the slip angle differential value, and uses the computed control component as a control component constituting a control amount of the second steering angle for executing the active steering control.

3. The vehicle steering apparatus according to claim 2, wherein the control means includes a first map in which the slip angle differential value is associated with a basic control amount of the control component based on the slip angle differential value, and
wherein, based on the basic control amount determined by referring to the slip angle differential value input to the first map, the control means computes a control component based on the slip angle differential value.

4. The vehicle steering apparatus according to claim 3, wherein, in the first map, an absolute value of the basic control amount increases as an absolute value of the slip angle differential value is increased.

5. The vehicle steering apparatus according to claim 3, wherein the control means includes a second map in which the vehicle speed is associated with a vehicle speed gain, and
wherein the control means computes a second control component based on the slip angle differential value by multiplying the basic control amount determined from the first map by the vehicle speed gain determined from the second map.

6. The vehicle steering apparatus according to claim 5, wherein, in the second map, a value of the vehicle speed gain is in a range in which the vehicle speed is equal to or less than the predetermined threshold value, and a value of the vehicle speed gain becomes smaller in accordance with increase in the vehicle speed in a range in which the vehicle speed exceeds the predetermined threshold value.

7. The vehicle steering apparatus according to claim 1, wherein the control means computes the slip angle differential value based on the following expression:

$$d\theta sp = Ry - (Fs/V),$$

where dθsp represents the slip angle differential value, Ry represents the yaw rate, Fs represents the lateral acceleration, and V represents the vehicle speed.

8. The vehicle steering apparatus according to claim 1, wherein when a steering characteristic of the vehicle is oversteer, the control means determines whether the active steering control should be started.

9. The vehicle steering apparatus according to claim 8, wherein when executing an oversteer control as the active steering control, the control means actuates the variable transmission ratio device so as to change the second steering angle in a direction opposite to a yaw moment of the vehicle.

10. The vehicle steering apparatus according to claim 9, wherein the control means determines whether right and left wheels of the vehicle respectively exist on two road surfaces having different friction resistances, wherein, using, as a trigger a result of determining whether right and left wheels of the vehicle respectively exist on two road surfaces having different friction resistances, the control means computes a yaw angle F/B command angle through a yaw angle F/B calculation based on a target yaw angle and a yaw angle, and wherein the yaw angle F/B command angle is a control component constituting a control amount of the second steering angle for executing the oversteer control.

11. The vehicle steering apparatus according to claim 1, wherein when a steering characteristic of the vehicle is understeer, the control means actuates the variable transmission ratio device so as to reduce a change an amount of the tire angle of the vehicle wheel with respect to a turning operation of the steering wheel.

12. The vehicle steering apparatus according to claim 1, further comprising:

a steering force assist apparatus that applies an assist force for assisting an operation of the steering wheel to the steering transmission system; and an assist force control apparatus controlling actuation of the steering force assist apparatus.

13. The vehicle steering apparatus according to claim 12, wherein the assist force control apparatus executes power assist control for controlling actuation of the steering force assist apparatus, while acting in concert with the active steering control.

* * * * *